(12) United States Patent
Springston et al.

(10) Patent No.: US 7,938,612 B2
(45) Date of Patent: May 10, 2011

(54) BATTERY-CHANGING VEHICLE WITH CANTILEVERED BOOM

(75) Inventors: Eric D. Springston, York, SC (US); John R. Pratt, Charlotte, NC (US); Dale A. Williams, Fort Mill, SC (US)

(73) Assignee: Multi-Shifter, Inc., Charlotte, NC (US)

( * ) Notice: Subject to any disclaimer, the term of this patent is extended or adjusted under 35 U.S.C. 154(b) by 639 days.

(21) Appl. No.: 11/851,994

(22) Filed: Sep. 7, 2007

(65) Prior Publication Data
US 2009/0067967 A1    Mar. 12, 2009

(51) Int. Cl.
B65G 67/02    (2006.01)
(52) U.S. Cl. ........ 414/501; 414/347; 414/392; 414/395; 414/399; 414/400; 414/542; 414/660
(58) Field of Classification Search .............. 414/331.1, 414/347, 348, 352, 392, 501, 529, 542, 561, 414/591, 659, 660, 395, 399, 400; 104/34
See application file for complete search history.

(56) References Cited

U.S. PATENT DOCUMENTS

| | | | | |
|---|---|---|---|---|
| 3,006,485 A | * | 10/1961 | Martin | 414/542 |
| 3,122,244 A | * | 2/1964 | Corso | 414/462 |
| 3,258,142 A | * | 6/1966 | Girardi | 414/508 |
| 3,327,875 A | | 6/1967 | Goodacre | |
| 3,797,408 A | * | 3/1974 | Barber et al. | 104/246 |
| 4,120,411 A | * | 10/1978 | Johnson | 414/351 |
| 4,227,463 A | * | 10/1980 | Pfleger | 104/34 |
| 4,450,400 A | * | 5/1984 | Gwyn | 320/109 |
| 4,808,058 A | * | 2/1989 | Carney et al. | 414/343 |
| 5,018,933 A | * | 5/1991 | Kramer | 414/542 |
| 5,486,082 A | * | 1/1996 | Feldman et al. | 414/542 |
| 5,545,967 A | | 8/1996 | Osborne et al. | |
| 5,718,555 A | * | 2/1998 | Swalheim | 414/502 |
| 2006/0160684 A1 | | 7/2006 | Springston et al. | |

FOREIGN PATENT DOCUMENTS

| | | | |
|---|---|---|---|
| DE | 103 49 826 A1 | | 5/2004 |
| EP | 0030928 A1 | * | 6/1981 |
| GB | 2024117 A | * | 1/1980 |
| GB | 2105294 A | * | 3/1983 |
| JP | 2-99888 | | 4/1990 |
| WO | WO 2006/083564 | | 8/2006 |

OTHER PUBLICATIONS

Search Report for International Patent Application No. PCT/US2008/075069; Search completed on Oct. 24, 2008.

* cited by examiner

*Primary Examiner* — James Keenan
(74) *Attorney, Agent, or Firm* — Alston & Bird LLP

(57) ABSTRACT

A battery-changing vehicle includes a mobile carriage, a frame disposed above the mobile carriage, and a boom assembly connected to the frame. The mobile carriage defines a loading deck for receiving and transporting a battery. The boom assembly includes a lift hoist that lifts a battery to and from the loading deck. The lift hoist is capable of lateral movement between an extended disposition, at which the lift hoist is cantilevered away from the loading deck, and a withdrawn disposition, at which the lift hoist is disposed above the loading deck. The battery-changing vehicle may also include a transfer arm capable of transferring a battery to and from the loading deck.

14 Claims, 3 Drawing Sheets

BATTERY-CHANGING VEHICLE WITH CANTILEVERED BOOM

FIELD OF THE INVENTION

The invention generally relates to vehicles and methods for handling batteries, and more particularly relates to battery-changing vehicles in facilities where battery-powered vehicles, such as forklifts, are used.

BACKGROUND OF THE INVENTION

Battery-powered vehicles, such as forklifts, are in popular use in many warehouses, product distribution facilities, package-handling centers, and other industrial facilities. The batteries of such vehicles require charging and maintenance and are typically at least occasionally removed from the vehicles. Indeed, in some facilities, battery-powered vehicles are used in multiple shifts that divide the day. In many scenarios, it is desirable to continue use of a battery-powered vehicle while a spent battery is recharged. In a somewhat typical facility, spent batteries are periodically replaced in battery-powered vehicles, and the spent batteries are recharged while the vehicles are continuously used. Thus, downtime in the use of a battery-powered vehicle such as a forklift is minimized with regard to charging batteries.

Available resources for changing the batteries of battery-powered vehicles include racks for charging and storing batteries and various types of vehicles and assemblies for transporting batteries to and from the racks and the battery-powered vehicles. For example, overhead gantry cranes are used in some facilities to remove and replace the batteries of some forklifts. However, overhead access to the battery bay of a vehicle is required if a battery is to be suspended from the chain of a gantry crane and placed directly into the battery bay. A typical battery-powered forklift has a battery bay below the driver's seat, and has protective structural members, and perhaps a roof, disposed above the driver's seat. Some such forklifts have slots defined between the structural members to permit a chain to pass to the battery bay so that an overhead gantry crane can reach the battery. Others have battery bays that receive batteries from the side of the forklift. Thus, not all forklifts are easily serviced by use of an overhead gantry crane.

Where side-loading battery bays are found, inconveniences arise when available equipment does not vertically align with the height of the battery. In some facilities, multiple types of forklifts are found. Thus, it is common that risky ad-hoc solutions are attempted when forklift batteries are to be serviced. Personal injuries, equipment damages, and delays can occur when an industrial battery, which is typically very heavy, falls even a few inches.

Thus, improved battery-handling equipment and methods are needed. A battery-changing vehicle capable of retrieving a spent battery from, and delivering a charged battery to, a battery-powered vehicle is needed.

BRIEF SUMMARY OF THE INVENTION

The present invention addresses the need for a battery-changing vehicle that provides a battery to a second vehicle such as a battery-powered forklift. According to one aspect of the invention, a battery-changing vehicle includes a mobile carriage, a frame disposed above and connected to the mobile carriage, and a boom assembly connected to the frame. The mobile carriage, which is capable of longitudinal movement along a first axis, defines a loading deck for receiving and transporting a battery. The boom assembly includes a lift hoist that is capable of lifting a battery to and from the loading deck. The lift hoist is laterally movable along a second axis, which is perpendicular to the first axis. The lift hoist is capable of lateral movement between an extended disposition, at which the lift hoist is cantilevered away from the loading deck, and a withdrawn disposition, at which the lift hoist is disposed above the loading deck. In at least one embodiment, the battery-changing vehicle also includes a transfer arm capable of transferring a battery to and from the loading deck.

Furthermore, in at least one embodiment, the boom assembly includes a sled that engages the frame and moves laterally relative the loading dock. The lift hoist is supported by one or more laterally disposed rails that are mounted upon and move with the sled. A first actuator applies force between the sled and the frame causing lateral movement of the boom assembly. The boom assembly includes a second actuator that engages the lift hoist and the sled, and that applies force between the lift hoist and the sled causing lateral movement of the lift hoist along the rails. Moreover, in at least one embodiment of the battery-changing vehicle, a stationary track is engaged by the mobile carriage along a lateral side of the mobile carriage. The stationary track guides longitudinal movement of the mobile carriage and prevents upward motion of the lateral side to prevent tipping of the carriage when the lift hoist is disposed at the extended disposition.

According to another aspect of the invention, a battery-changing vehicle includes a mobile carriage, a transfer assembly, a frame, and a boom assembly. The mobile carriage defines a horizontal loading deck for receiving and transporting a battery. The transfer assembly is connected to the mobile carriage and includes a transfer arm capable of horizontally transferring a battery to and from the loading deck. The transfer arm may include an electromagnet capable of magnetically engaging a battery and horizontally transferring the magnetically engaged battery to and from the loading deck. The frame is disposed above, and connected to, the mobile carriage. The boom assembly is connected to the frame, and includes a lift hoist capable of vertically and horizontally moving a battery to and from the loading deck. The lift hoist is capable of movement between an extended disposition, at which the lift hoist is cantilevered away from the loading deck, and a withdrawn disposition, at which the lift hoist is disposed above the loading deck. The boom assembly may further include a horizontally disposed rail, which is capable of horizontal movement relative to the frame, and along which the lift hoist is capable of horizontal movement.

Yet another aspect of the invention relates to a method of providing a battery. A battery-changing vehicle is moved to align its loading deck with an available battery. The available battery is engaged by a transfer arm coupled to the vehicle, and transferred onto the loading deck by movement of the transfer arm. The battery is engaged by a boom assembly, moved from the loading deck to a raised position at which the battery is positioned above a battery bay defined by a second vehicle, and lowered into the battery bay. In at least one version of the method, moving the battery to the raised position includes lifting the battery by the boom assembly, and horizontally extending the boom assembly from the battery-changing vehicle. When the battery is lifted to the raised position above the battery bay, a horizontally disposed rail of the boom assembly may be disposed between the battery bay and a roof of the second vehicle.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION OF THE DRAWINGS

The present invention now will be described more fully hereinafter with reference to the accompanying drawings in which some but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
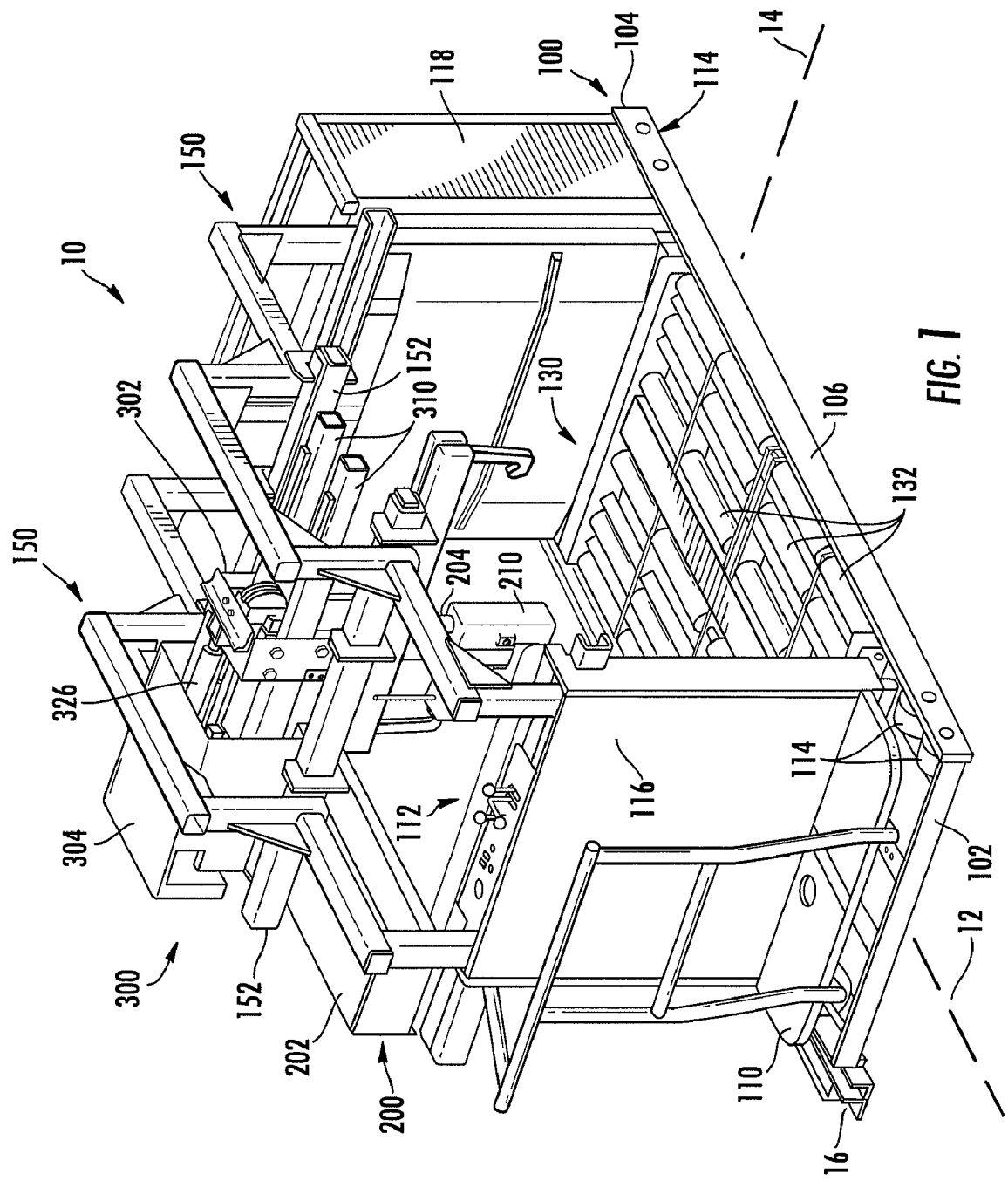
FIG. 1 is a perspective view of a battery-changing vehicle in accordance with an embodiment of the invention.

A battery-changing vehicle 10 in accordance with a first embodiment of the invention is represented in FIG. 1. Movements of the battery-changing vehicle, and components thereof, are described herein as longitudinal and lateral. Longitudinal movement refers to movement in either of two directions along or parallel to a horizontal first axis, which is nominally identified herein as the longitudinal axis 12. Lateral movement refers to movement in either of two directions along or parallel to a horizontal second axis, which is perpendicular to the first axis, and which second axis is nominally identified herein as the lateral axis 14.

The battery-changing vehicle includes a mobile carriage 100 by which the vehicle is capable of movement in either of two directions along the longitudinal axis 12. The mobile carriage defines first and second longitudinal ends 102 and 104, respectively, and first and second lateral sides 106 (FIG. 1) and 108 (FIG. 2), respectively. The mobile carriage includes a platform 110 (FIG. 1) that supports and transports a human operator who controls movements and functions of the battery-changing vehicle by actuating control elements 112, which may include levers, knobs, switches, joysticks, pedals, and the like. The control elements may also include interfacing elements such as cable connections and wireless communication devices through which the battery-changing vehicle is controlled by a human operator utilizing a control device or a control station. Thus, an operator may have the options of riding along with movements of the battery-changing vehicle and remotely controlling the vehicle. The battery-changing vehicle may furthermore be structured as a fully automated or semi-automated robotic system that operates independently with or without immediate monitoring by humans or that accomplishes some portions of its tasks without direct human control.

The mobile carriage includes carriage wheels 114 upon which the vehicle 10 is capable of moving along a facility floor. Some or all of the mobile carriage wheels 114 are motorized or operatively coupled to one or more motors to motivate longitudinal movement of the vehicle 10. First and second longitudinal end housings 116 and 118 house and protect functional components of the vehicle 10. That is, the end housings may house electrical components, motors, hydraulic pumps, and hydraulic manifolds. Also, any number of electrical cables, hydraulic lines, and mechanical linkage elements may be disposed within the end housings and may be disposed upon the vehicle without explicit description or representation herein in order that these descriptions and the referenced drawings may concentrate on novel and advantageous features of the battery-changing vehicle 10. For example, flexible serpentine cable trays, hydraulic lines, and other linkage elements may be disposed between components that move relative to each other, without explicit description or representation herein.

The mobile carriage defines a loading deck 130 for receiving and transporting a battery. The loading deck is accessible from both lateral sides 106 and 108 of the mobile carriage, and can thereby be loaded or unloaded from either lateral side for convenience to human operators. For example, the battery-changing vehicle can deliver a battery to, or receive a battery from, a battery charging rack or storage rack through either lateral side. In the embodiment of the battery-changing vehicle represented in FIG. 1, the loading deck 130 is defined at least in part by longitudinally disposed rollers 132 that are rotatable about respective longitudinal axes to permit lateral movements of batteries disposed upon the loading deck.

The battery-changing vehicle includes a transfer assembly 200 connected to the mobile carriage. The transfer assembly includes a gantry member 202, which is movably connected to mobile carriage, and a transfer arm 204, which is movably connected to the gantry member. The gantry member is longitudinally disposed and is movably connected at opposing ends thereof to the mobile carriage. The gantry member 202 is capable of lateral movement relative to the mobile carriage so that the transfer arm 204 can be positioned at any lateral position above the loading deck 130. The transfer arm 204 is capable of longitudinal movement relative to the gantry member 202 so that the transfer arm can be positioned at any longitudinal position above the loading deck 130. Thus, the transfer arm is capable of movement in two horizontal dimensions according to lateral movement with the gantry member in a first horizontal dimension and longitudinal movement along the gantry member in a second horizontal dimension.

The transfer arm includes a battery engaging element 210 that is capable of engaging a battery and, by movements of the transfer arm, horizontally transferring an engaged battery to and from the loading deck 130. In the embodiment represented in FIG. 1, the battery engaging element 210 comprises an electromagnet that magnetically engages a battery to transfer the battery. In another embodiment, the battery engaging element comprises a suction device that engages a battery by vacuum engagement. In yet another embodiment, the battery engaging element comprises a claw, pin, hook, or hitch that mechanically engages a battery. The battery engaging element can be capable of full or partial rotation about a vertical axis so that a battery can be engaged from any one of several directions. For example, a battery disposed proximal the mobile carriage along either one of lateral sides 106 and 108 could be engaged and transferred to the loading deck. Similarly, a battery disposed on the loading deck could be engaged and transferred off of the loading deck along either lateral side. Transferring batteries includes dragging, pushing, or sliding the batteries with the transfer assembly 200 from one horizontal surface to another, as is known in the art. Thus, the transfer assembly need not support the full weight of a battery being transferred.

Insofar as battery storage and charging racks receive and dispense and batteries at the height of the loading deck 130 above a facility floor, the battery-changing vehicle 10 is capable of delivering and retrieving batteries to and from such racks by use of the transfer assembly 200. Furthermore, insofar as battery-powered vehicles receive and hold batteries at the height of the loading deck 130, the battery-changing vehicle is capable of removing spent batteries from, and delivering charged batteries to, such battery-powered vehicles by use of the transfer assembly 200. However, in some facilities, circumstances arise in which the vertical height of the loading deck above the floor is not well matched with the source location or destination of a battery that is to be moved. For example, when the spent battery of a battery-powered vehicle such as a fork lift is to be replaced by a charged battery, challenges can arise due to the variety in constructions of fork lifts. Fork lifts are available in different varieties that hold batteries at different respective particular heights. Also, some varieties of fork lifts include a battery bay from which a battery must be vertically and horizontally moved. Indeed, some facilities are equipped with several varieties of battery-powered vehicles and so a challenge arises when using a single battery-changing vehicle to service multiple dissimilar battery-powered vehicles. In such circumstances, the inventive battery-changing vehicle 10 provides benefits and advantages by features particularly described in the following.

Figure 2:
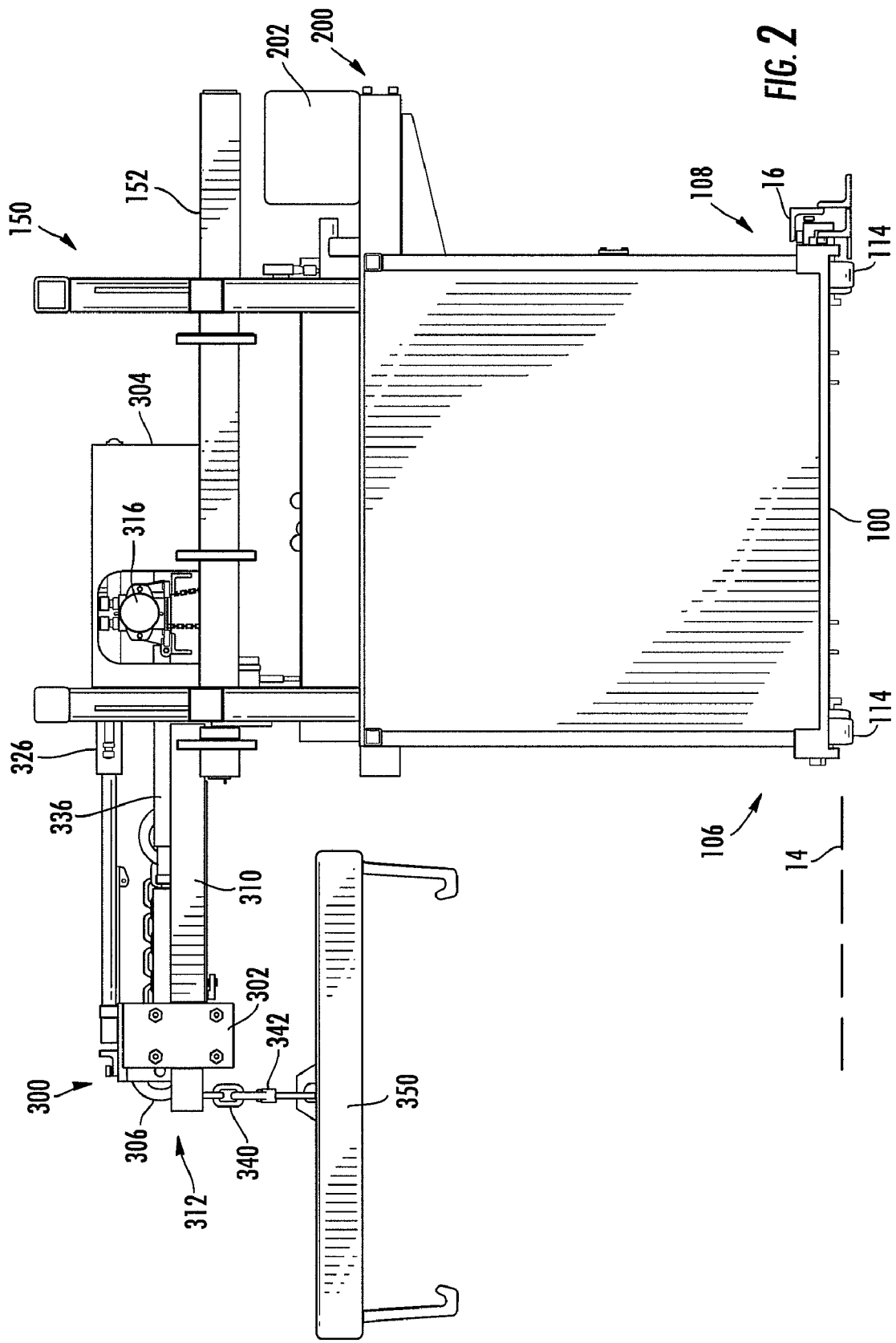
FIG. 2 is an elevational view of the battery-changing vehicle of FIG. 1, taken along a longitudinal axis of the vehicle.

The battery-changing vehicle 10 includes a frame 150 and a boom assembly 300 (FIGS. 1-2). The frame 150 is disposed above and connected to the mobile carriage 100. The boom assembly 300 is connected to the frame and includes a lift hoist 302 capable of vertically and horizontally moving a battery to and from the loading deck. The lift hoist 302 is movable between an extended disposition and a withdrawn disposition. The lift hoist 302 is shown in the extended disposition in FIGS. 2 and 3, in which the lift hoist is cantilevered away from the loading deck. The lift hoist is shown in the withdrawn disposition in FIG. 1, in which the lift hoist is disposed above the loading deck 130.

The boom assembly 300 includes and travels with a sled 304 that is capable of lateral movement relative to the mobile carriage. The sled 304 engages, is disposed between, and moves along a spaced pair of laterally disposed channel members 152 of the frame 150. The boom assembly includes a first actuator 316 (FIG. 2) that engages the sled and the frame to apply force between the sled and the frame to cause lateral movement of the boom assembly relative to the mobile carriage and loading deck. For example, though other types of actuators are well within the scope of these descriptions, the first actuator 316 is represented in FIG. 2 as a rotary motor connected to the sled. The rotary motor is engaged by a chain to a pinion rotatably mounted on the sled. The pinion engages a rack mounted in one of channel members along which the sled moves. Thus, the sled is motivated by rack-and-pinion engagement to move in two opposing lateral directions upon rotation of the rotary motor in two opposing rotational directions. The first actuator 316 may be powered electrically, hydraulically, or by one or more mechanical linkages.

The boom assembly 300 includes a spaced pair of horizontally and laterally disposed rails 310 that are connected to and travel with the sled 304. By lateral movement of the sled along the channel members of the frame, the rails 310 can be disposed at least partially above (FIGS. 1-2) the loading deck or cantilevered away (FIG. 3) from the loading deck. The lift hoist 302 is supported by the rails 310 and is capable of lateral movement along the rails relative to the mobile carriage and loading deck. The boom assembly 300 includes a second actuator 326 (FIGS. 1-2) that engages the lift hoist and the sled to apply force between the lift hoist and the sled to cause lateral movement of the lift hoist relative to the sled, the mobile carriage, and the loading deck. For example, though other types of actuators are well within the scope of these descriptions, the second actuator 326 is represented in FIG. 2 as a laterally disposed hydraulic cylinder connected to the lift hoist and to the sled. Thus, the lift hoist is engaged by the hydraulic cylinder to move in two opposing lateral directions upon extension and withdrawal of the hydraulic cylinder.

The extended disposition of the lift hoist 302 is achieved as shown in FIG. 2 when the first actuator 316 positions the sled toward the first lateral side 106 of the mobile carriage and the second actuator 326 positions the lift hoist toward distal ends 312 (FIG. 2) of the rails 310. At the extended disposition, the lift hoist is cantilevered away from the mobile carriage and loading deck. The withdrawn disposition of the lift hoist 302 is achieved as shown in FIG. 1 when the first actuator positions the sled toward the second lateral side 108 and the second actuator 326 positions the lift hoist along the rails toward the sled. At the withdrawn disposition, the lift hoist is disposed above the loading deck.

The boom assembly further includes a flexible line member 340 (FIG. 2) extending downward from the lift hoist. The lift hoist is capable of moving a battery to and from the loading deck by use of the line member. Though other types of line members such as ropes, wire cables, and belts are within the scope of these descriptions, the line member 340 is represented in FIG. 2 as a chain of links. In the illustrated embodiment, the lift hoist includes a pulley 306 about which the line member 340 passes. The boom assembly includes a third actuator 336 that engages the lift hoist and the flexible line member. The lift hoist is capable of lifting a battery by use of the line member upon actuation of the third actuator. Actions of the third actuator lower and forcibly raise the distal end 342 of the line member, which distal end extends downward from the lift hoist for engaging a battery.

Though other types of actuators are well within the scope of these descriptions, the third actuator 336 is represented in FIG. 2 as a laterally disposed hydraulic cylinder connected to the lift hoist and to the flexible line member. Upon extension of the hydraulic cylinder, the distal end 342 of line member 340 is forcibly raised across the pulley 306. Upon withdrawal of the hydraulic cylinder, the distal end of the flexible line member is lowered from the pulley. The third actuator is connected to and travels with the lift hoist. Thus, the vertical height of the distal end of the line member 340, and the lifted height of any battery suspended therefrom, are unaffected by lateral movements of the lift hoist and sled. Thus, any battery suspended from the line member can be positioned above the loading deck or can be cantilevered away from the loading deck once a desired lifted height is achieved. Furthermore, such a battery can be raised or lowered, when desired, by actuation of the third actuator without horizontal movement of the battery. A lifting beam 350 is attached to the distal end 342 of the flexible line member 340. The lifting beam 350 includes a pair of opposing hooks for engaging opposite sides of a battery. The lifting beam raises and lowers with the distal end 342 of the line member 340 according to actions of the third actuator 336.

Figure 3:
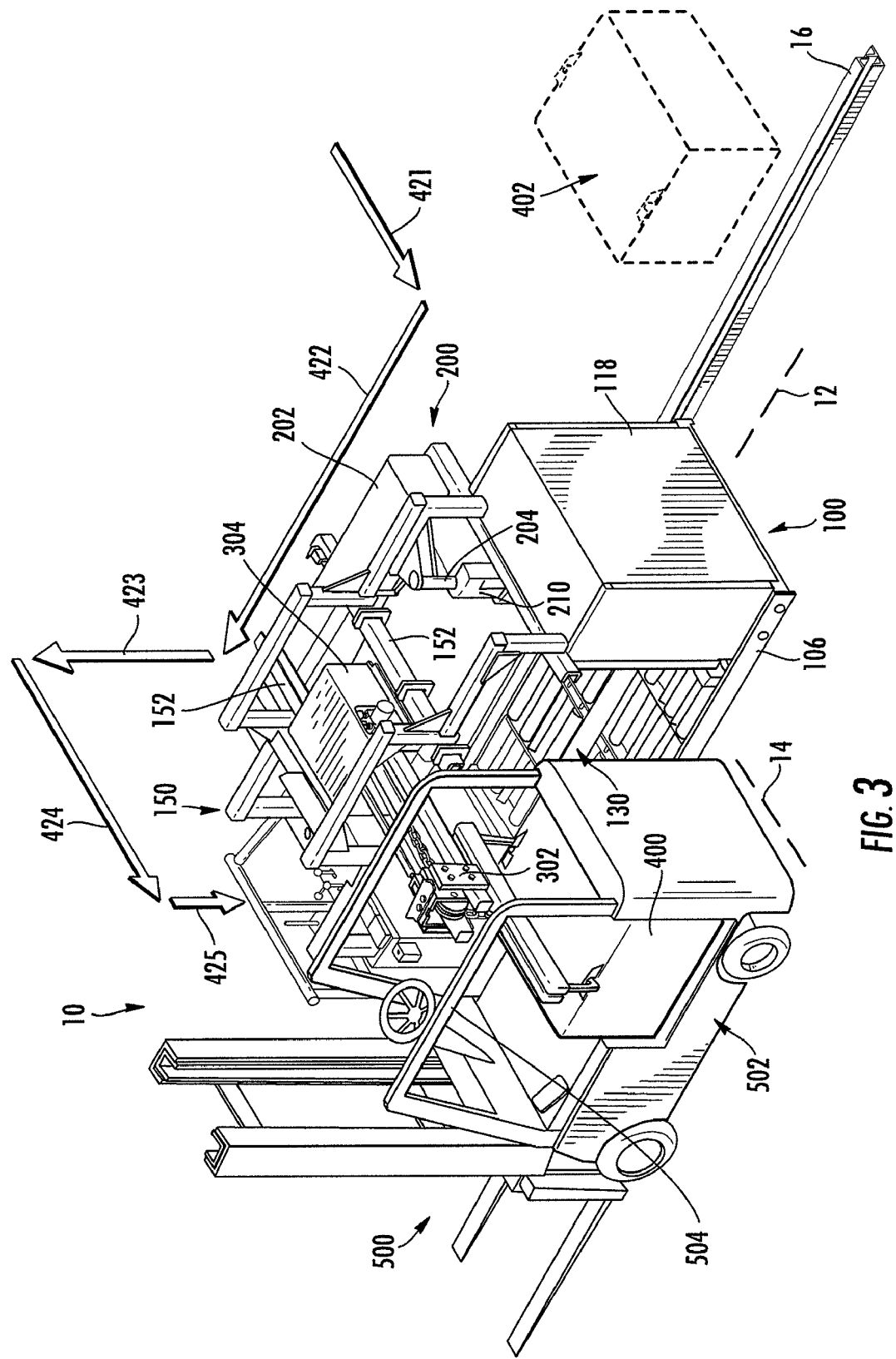
FIG. 3, which is a perspective environmental view of the battery-changing vehicle of FIG. 1, represents a scenario in which a battery is provided to a second vehicle.

FIG. 3 represents a scenario wherein a battery 400 is provided to a battery-powered vehicle 500 by use of the battery-changing vehicle 10. The battery previously was available at a first location 402. The battery-changing vehicle was moved to align the loading deck (FIG. 1) with the battery available at the first location. Such movement and alignment was accomplished by longitudinal movement of the battery-changing vehicle along the longitudinal axis 12. The battery was then engaged by the transfer arm 204. Such engagement was accomplished by: at least partial rotation of the transfer arm about a vertical axis to direct the battery engaging element 210 toward the available battery; lateral movement of the gantry member 202 to contact the available battery with the battery engaging element; and, activation of the battery engaging element to engage the battery. The engaged battery was then transferred, as represented by the lateral transfer vector 421 in FIG. 3, onto the loading deck by movement of the transfer arm. Such transfer was accomplished by lateral movement of the gantry member 202 toward the first lateral side 106, the transfer arm and engaged battery moving laterally with the gantry member, until the engaged battery was disposed upon the loading deck. The battery-changing vehicle, with the battery disposed upon the loading deck, was then moved along the longitudinal axis 12 to align the battery with the battery-powered vehicle 500. The movement of the battery with the battery-changing vehicle is represented by the longitudinal movement vector 422 in FIG. 3

The battery disposed upon the loading deck was then engaged by the boom assembly 300. For example, in the embodiment of the battery-changing vehicle represented in FIGS. 1-3, the engagement was accomplished by: sending the lift hoist 302 toward the withdrawn disposition (FIG. 1) to dispose the lift hoist 302 above the battery disposed upon the loading deck; and, lowering the line member 340 (FIG. 2) to engage the battery with the hooks of the lifting beam. The battery was then moved from the loading deck to a raised position at which the battery was positioned above a battery bay 502 defined by the battery-powered vehicle 500 (FIG. 3). Moving the battery was accomplished by: lifting the battery from the loading deck as represented by the vertical lift vector 423 in FIG. 3, with the battery supported by the boom assembly 300; and, horizontally extending the boom assembly from the battery-changing vehicle 10 to dispose the lifted battery 400 above the battery bay 502. For example, in the embodiment of the battery-changing vehicle represented in FIGS. 1-3, horizontally extending the boom assembly includes sending the lift hoist 302 toward the extended disposition (FIG. 2), thereby laterally moving the battery as represented by the lateral movement vector 424 in FIG. 3. The lifted battery was then lowered into the battery bay 502 of the battery-powered vehicle, as accomplished by lowering of the line member 340 (FIG. 2), and as represented by the vertical lowering vector 425 in FIG. 3. To complete the scenario, the battery will be disengaged from the boom assembly, the boom assembly will be withdrawn, and the second vehicle will move away from the battery-changing vehicle by power of the delivered battery.

Batteries for use in industrial battery-powered vehicles, such as fork lifts, can be quite heavy. For example, the weights of some industrial batteries can range from two-hundred to over five-thousand pounds. The weight of a battery supported by the boom assembly, when the boom assembly is extended to position the battery above a battery bay of a powered vehicle as represented in FIG. 3, may correspond to a torque toward tipping of the battery-changing vehicle 10. With regard toward preventing such tipping, in some embodiments the battery-changing vehicle 10 is guided and retained by a stationary track 16 disposed along and connected to a facility floor. The stationary track is engaged by the mobile carriage 100 along the second lateral side 108. That is, the stationary track is engaged by the mobile carriage along a side of the battery-changing vehicle that is opposite the side from which the boom assembly extends. When provided, the stationary track prevents upward motion of the second lateral side 108 of the mobile carriage, thereby preventing tipping of the battery-changing vehicle. The stationary track furthermore limits motion of the mobile carriage to longitudinal movements along the longitudinal axis 12.

In the scenario of FIG. 3, a battery is provided to the battery-powered vehicle 500 by use of the battery-changing vehicle 10. The scenario of FIG. 3 has been described to relate expressly to the movement of an available battery at a first location 402 to the battery bay 502. It should be understood that, by consideration of the vectors 421-425 in directions opposite their representations in FIG. 3, and by consideration of these descriptions in a reverse order, the battery-changing vehicle 10 is understood to be capable of retrieving a battery from the battery-powered vehicle and delivering the battery to the location 402, or some other location.

The location 402 in FIG. 3 is represented as disposed opposite the longitudinal axis 12 from the battery-powered vehicle 500. Thus, according to the arrangement represented in FIG. 3, the battery is transferred to the battery-changing vehicle by way of the second lateral side 108 of the mobile carriage. However, it should be understood that these descriptions and FIG. 3 relate furthermore to a scenario in which the first location 402 is disposed toward the first lateral side 106 of the mobile carriage and the battery is transferred to the battery-changing vehicle by way of the first lateral side. The transfer arm 204 is capable of transferring batteries to and from the loading deck of the battery-changing vehicle 10 by way of the first lateral side 106 and by way of the second lateral side 108.

FIG. 3 exhibits particular advantages of the inventive battery-changing vehicle 10. For example, in FIG. 3, the horizontally disposed rails 310 are disposed between the battery bay 502 and the roof members 504 of the battery-powered vehicle 500. Thus, the battery-changing vehicle 10 is able to retrieve a spent battery from, and deliver a charged battery to, the battery-powered vehicle without dangling a cable and battery from an overhead crane. This is believed to represent safety and convenience advantages. Indeed, some battery-powered vehicles such as some types of fork lifts have roof panels or other roof members that prevent or impede battery retrieval and delivery by an overhead crane.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A battery-changing vehicle comprising:
   a mobile carriage defining a loading deck for receiving and transporting a battery, the mobile carriage being longitudinally movable along a first axis;
   a transfer assembly connected to the mobile carriage, the transfer assembly comprising a transfer arm capable of horizontally transferring a battery to and from the loading deck without supporting the full weight of a battery and configured to rotate about a vertical axis;
   a frame disposed above and connected to the mobile carriage; and
   a boom assembly connected to the frame, the boom assembly comprising a lift hoist capable of lifting a battery from the loading deck, the lift hoist being at least laterally movable relative to the loading deck along a second axis that is perpendicular to the first axis, the lift hoist being laterally movable between an extended disposition, at which the lift hoist is cantilevered away from the loading deck, and a withdrawn disposition, at which the lift hoist is disposed above the loading deck.

2. A battery-changing vehicle according to claim 1, wherein the transfer arm is longitudinally movable relative to the loading deck.

3. A battery-changing vehicle according to claim 1, wherein the boom assembly further comprises at least one laterally disposed rail, wherein the lift hoist is supported at least in part by the rail, and wherein the lift hoist is laterally movable along the rail relative to the loading deck.

4. A battery-changing vehicle according to claim 3, wherein the rail is laterally movable relative to the loading deck.

5. A battery-changing vehicle according to claim 3, wherein the boom assembly further comprises a sled engaging the frame, wherein the sled is at least laterally movable relative to the loading deck, and wherein the rail is mounted upon and is movable with the sled.

6. A battery-changing vehicle according to claim 5, wherein the boom assembly further comprises a first actuator engaging at least one of the sled and the frame, and wherein the first actuator is structured to apply force between the sled and the frame causing lateral movement of the boom assembly relative to the loading deck.

7. A battery-changing vehicle according to claim 6, wherein the boom assembly further comprises a second actuator engaging at least one of the lift hoist and the sled, and wherein the second actuator is structured to apply force between the lift hoist and the sled causing lateral movement of the lift hoist along the rail.

8. A battery-changing vehicle according to claim 7, wherein the boom assembly further comprises:
a flexible line member extending from the lift hoist, the lift hoist being capable of lifting a battery from the loading deck by use of the line member; and
a third actuator engaging at least one of the lift hoist and the flexible line member, the lift hoist being capable of lifting a battery from the loading deck by use of the line member upon actuation of the third actuator.

9. A battery-changing vehicle according to claim 1, wherein the mobile carriage further defines opposing first and second longitudinal ends and opposing first and second lateral sides such that the lift hoist is cantilevered away from the first lateral side when disposed at the extended disposition, and wherein the battery-changing vehicle further comprises:
a stationary track engaged by the mobile carriage along the second lateral side, the stationary track guiding longitudinal movement of the mobile carriage and preventing upward motion of the second lateral side of the mobile carriage.

10. A battery-changing vehicle comprising:
a mobile carriage defining a horizontal loading deck for receiving and transporting a battery;
a transfer assembly connected to the mobile carriage, the transfer assembly comprising a transfer arm capable of horizontally transferring a battery to and from the loading deck without supporting the full weight of a battery and configured to rotate about a vertical axis;
a frame disposed above and connected to the mobile carriage; and
a boom assembly connected to the frame, the boom assembly comprising a lift hoist capable of vertically and horizontally moving a battery to and from the loading deck, the lift hoist being movable between an extended disposition at which the lift hoist is cantilevered away from the loading deck and a withdrawn disposition at which the lift hoist is disposed above the loading deck.

11. A battery-changing vehicle according to claim 10, wherein the boom assembly further comprises a horizontally disposed rail along which the lift hoist is horizontally movable, the rail being horizontally movable relative to the frame.

12. A battery-changing vehicle according to claim 10, wherein the transfer arm is movable in two horizontal dimensions.

13. A battery-changing vehicle according to claim 10, wherein the transfer arm comprises an electromagnet capable of magnetically engaging a battery and horizontally transferring the magnetically engaged battery to and from the loading deck.

14. A battery-changing vehicle according to claim 10, wherein the lift hoist is cantilevered away from a first side of the mobile carriage when disposed at the extended disposition, and wherein the battery-changing vehicle further comprises:
a stationary track engaged by the mobile carriage along a second side of the mobile carriage, the second side being opposite the first side, such that the stationary track prevents upward motion of the second side of the mobile carriage.

* * * * *